(12) United States Patent
Schertler (10) Patent No.: US 8,442,271 B2
(45) Date of Patent: May 14, 2013

(54) LASER DETECTION DEVICE AND LASER DETECTION METHOD

(75) Inventor: Klaus Schertler, Garching (DE)

(73) Assignee: Eads Deutschland GmbH, Ottobrunn (DE)

(*) Notice: Subject to any disclaimer, the term of this patent is extended or adjusted under 35 U.S.C. 154(b) by 156 days.

(21) Appl. No.: 13/128,527

(22) PCT Filed: Nov. 5, 2009

(86) PCT No.: PCT/EP2009/064676
§ 371 (c)(1),
(2), (4) Date: Jun. 21, 2011

(87) PCT Pub. No.: WO2010/054977
PCT Pub. Date: May 20, 2010

(65) Prior Publication Data
US 2012/0087542 A1     Apr. 12, 2012

(30) Foreign Application Priority Data

Nov. 12, 2008 (DE) .......................... 10 2008 056 868

(51) Int. Cl.
*G06K 9/00* (2006.01)
*G03H 1/02* (2006.01)

(52) U.S. Cl.
USPC ........................................... 382/103; 359/27

(58) Field of Classification Search ............... 382/103, 382/107, 236; 348/67, 154, 155, 169, 170, 348/171, 172, 352; 356/352, 519; 359/27, 359/331, 362, 719
See application file for complete search history.

(56) References Cited

U.S. PATENT DOCUMENTS

| 6,151,114 A * | 11/2000 | Russell .......................... 356/519 |
| 2007/0057074 A1 | 3/2007 | Cheung et al. |
| 2008/0144899 A1 | 6/2008 | Varma et al. |

FOREIGN PATENT DOCUMENTS

| DE | 198 51 010 A1 | 6/2007 |
| WO | WO-2008141800 A1 | 11/2008 |

OTHER PUBLICATIONS

Gonzales and Woods, Digital Image Processing, Pearson Prentice Hall, 2008 (English Abstract).
German Office Action of Corresponding German Application No. 10 2008 056 868.6-55, dated Jan. 30, 2009.
International Search Report of Corresponding International Application No. PCT/EP2009/064676, dated Apr. 19, 2010.
Written Opinion of the International Search Authority of corresponding International Application No. PCT/EP2009/064676, dated Apr. 19, 2010.

* cited by examiner

*Primary Examiner* — Abolfazl Tabatabai
(74) *Attorney, Agent, or Firm* — Global IP Counselors, LLP (57) ABSTRACT

A laser detection method and apparatus for detection of laser beams can each perform operations for producing an interference image from detected light radiation, recording the interference image, and processing the recorded interference image in order to detect laser radiation. In order to allow more robust and faster laser detection, the apparatus and method can detect a spatially defined point distribution from the interference image, and transform the point distribution such that a grid interval remains between a point grid in the point distribution, and a fixed position, which is independent of a position in the original image, is associated with the point grid. The apparatus and method can further detect a grid interval in the point grid that was transformed, and detect the position of the point grid from the point distribution by filtering with the assistance of the grid interval.

19 Claims, 6 Drawing Sheets

LASER DETECTION DEVICE AND LASER DETECTION METHOD

CROSS-REFERENCE TO RELATED APPLICATIONS

This U.S. National stage application claims priority under 35 U.S.C. §119(a) to German Patent Application No. 10 2008 056 868.6, filed in Germany on Nov. 12, 2008, the entire contents of which are hereby incorporated herein by reference.

BACKGROUND

1. Field of the Invention

The invention relates to a laser detection apparatus having the features of the precharacterizing clause of the attached claim 1, and to a laser detection method which can be carried out using said apparatus, having the steps of the precharacterizing clause of the attached claim 10. A laser detection apparatus such as this and a laser detection method such as this are known from DE 198 51 010 A1.

2. Background Information

In particular, the invention is intended to solve the problem of fast and robust identification and location of laser beam sources—in particular laser threats—by means of a laser warning system. Laser threats are caused, for example, by laser range-finders, laser target designators, laser beam riders or snipers.

The following description refers to the following references or documents and also relates to the ALTAS products from EADS Deutschland GmbH:

[1] "Einrichtung zur Erkennung und Lokalisierung von Laserstrahlungsquellen" (Kreuzgitter), [Device for identification and location of laser radiation sources" (cross grid)], filed Nov. 5, 1998, laid-open: Jun. 14, 2007, DE 198 51 010 A1,

[2] "Verfahren und Vorrichtung zur Erkennung, Lokalisierung und Verfolgen von Laserstrahlungsquellen" (Zeilen-Gitter) ["Method and apparatus for identification, location and tracking of laser radiation sources" (line grid)], German patent application from EADS Deutschland GmbH dated Jan. 29, 2007, inventor: Herr Thorsteinn Halldorsson;

[3] Gonzales and Woods, Digital Image Processing, Pearson Prentice Hall, 2008 (oder andere Lehrbücher der Bildverarbeitung) (or other image processing textbooks).

In particular, the ALIAS product range from EADS Deutschland GmbH and [1,2] can be cited as prior art.

In particular, DE 198 51 010 A1 discloses a laser detection apparatus and a laser detection method in which an interference pattern is produced from detected light and the interference pattern is investigated to determine whether it exhibits typical laser interference. An image processing unit is provided for this purpose, the aim of which, in particular, is to detect the symmetry of light spots, the position of a symmetrical light spot structure, and the intervals between the light spots.

The aim of the analysis of the interference pattern in the image processing unit is, in particular, detection of a grid interval and the position of the grid structure of laser interference points. However, the prior art does not describe how this analysis can be carried out robustly and quickly.

SUMMARY

Accordingly, an object of the invention is to develop a laser detection apparatus and a laser detection method for achieving fast and more robust analysis of an interference image produced within a laser warning system, with the aim of detecting characteristics of the laser beam source and.

This object can be achieved by a laser detection apparatus having the features described herein.

The invention provides a laser detection apparatus for detection of laser beams: an interference image production apparatus for production of an interference image from detected light radiation, an image recording device for recording the interference image, and an image processing unit for processing the interference image recorded by the image recording device, in order to detect laser beams in the light radiation.

In order to allow robust, fast and reliable detection of laser beams, the invention also provides that the image processing unit has a point detection device for detection of a spatially defined point distribution from the interference image, a trans-formation device for carrying out a transformation of the point distribution such that a grid interval remains between a point grid in the point distribution, but a fixed position, which is independent of the position thereof in the original image, is associated with the point grid, a grid interval detection device for detection of a grid interval in the point grid transformed by the transformation device, and a grid position detection device for detection of the position of the point grid from the point distribution by means of filtering, with the assistance of the grid interval detected by the grid interval detection device.

Furthermore, the invention provides a laser detection method, which can be carried out in particular using the laser detection apparatus according to the invention, for detection of laser beams having the following steps:

Production of an interference image from detected light radiation and processing of the interference image recorded, in order to detect laser radiation.

For robust and fast detection of laser beams, the invention proposes that the processing comprises the following steps:
a) Detection of a spatially defined point distribution from the interference image,
b) Carrying out a transformation of the point distribution such that a grid interval remains between a point grid in the point distribution, but a fixed position, which is independent of the position thereof in the original image, is associated with the point grid,
c) Detection of a grid interval in the point grid transformed according to step b), and
d) Detection of the position of the point grid from the point distribution by means of filtering with the assistance of the grid interval detected in step c).

The transformation according to step c) allows a grid interval to be detected particularly easily, since the grid interval can be detected independently of the original position of a point grid produced by laser radiation in the interference image, and therefore preferably always at the same location. For example, a centered spectral image is produced in the transformation, from which a grid interval can always be determined from the center.

The grid interval can be determined easily by investigating at points of point grids with corresponding grid intervals to determine whether an intensity which indicates laser radiation can be found overall at these points. If a particularly dominant intensity is found on one or more point grids with specific grid intervals, the presence of laser radiation can be deduced from this, which laser radiation typically produces a point grid with a grid interval such as this in the interference image.

The position of the original point grid can then also easily be found using a grid interval detected in this way, by filtering the original point image appropriately with a grid interval such as this such that point grids with a grid interval such as this occur in a dominant form in the filter result, and the position of the point grid can then be found easily in the filtered image.

This allows laser radiation to be detected quickly and robustly, in particular also in an interference image which has a multiplicity of irregular points caused, for example, by other light radiation. The influence of disturbance effects can easily be eliminated.

A Fourier transformation is preferably carried out as the transformation in step b). If only the magnitude is taken from a Fourier transformation such as this, phase information and therefore position information are lost. Back-transformation then results in an image in which point grids always appear at the same location (for example centered), independently of the original position, thus allowing grid interval identification to be carried out much more easily and with less computation effort.

There are many standard components and standard methods (standard software) for carrying out Fourier transformations, allowing operations such as these to be carried out with small, mobile, low-cost computation units.

BRIEF DESCRIPTION OF THE DRAWINGS

Exemplary embodiments of the invention will be explained in more detail in the following text with reference to the attached drawing, in which.

DETAILED DESCRIPTION OF EMBODIMENTS

The invention is based in particular on the works [1,2] relating to identification of laser beam sources using holographic grids. Therefore the following description of exemplary embodiments refers, in particular, to these references [1, 2] for further details of laser beam identification systems, apparatuses and methods.

Figure 1:
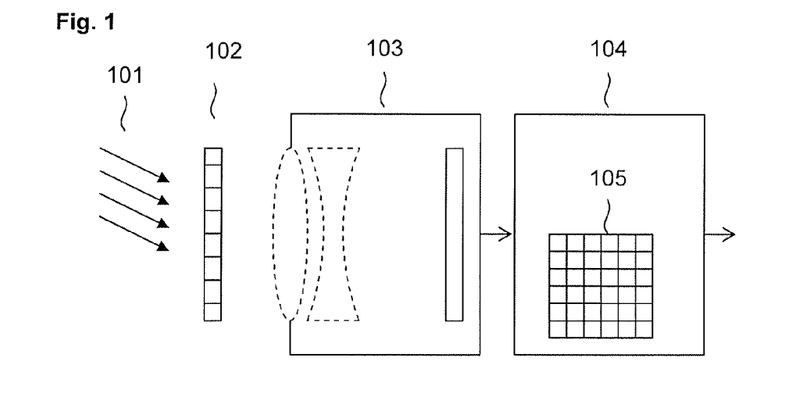
FIG. 1 shows a schematic illustration of a laser detection apparatus.

FIG. 1 shows one possible basic design of a laser detection apparatus 100 for detection of laser sources—indicated by laser beam 101 in FIG. 1. The laser detection apparatus 100 has an interference production device, in this case in the form of a holographic grid 102, an image recording device, in this case in the form of, for example, a digital camera 103, and an image processing unit 104. The interference pattern recorded by the camera 103 is made available as an interference image 105 to the image processing unit 104.

The basic design, shown in FIG. 1, of a laser detection apparatus 100 according to one exemplary embodiment of the invention is based on a fundamental design, based on the laser warning systems described in the references [1, 2]. In the laser detection apparatus 100, the laser light—laser radiation 101—originating from the laser beam source is passed through the holographic grid 102. The interference pattern produced in this way is recorded by the camera 103, and is supplied to the image processing unit 104 in the form of the interference image 105.

Figure 2:
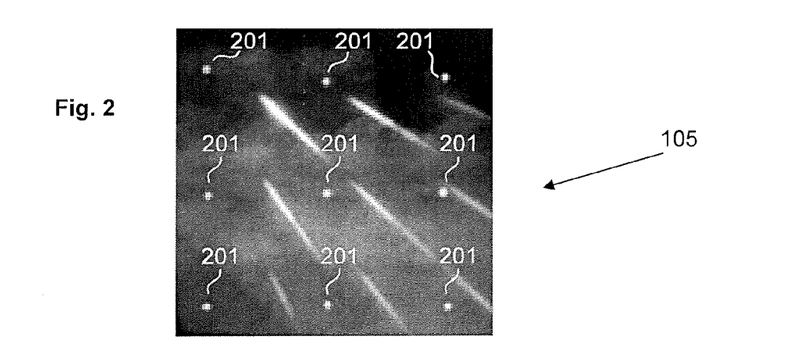
FIG. 2 shows an interference image, recorded by means of a camera, of a holographic grid.

FIG. 2 shows an example of an interference image 105 produced in this way. FIG. 2 shows an example of the interference image 105, as recorded by the camera 103, of the holographic grid 102. The points 201 arranged in a grid structure are laser interference points and represent the laser interference pattern of the laser source. The line patterns correspond to the interference pattern of the solar radiation, and the background structure shows clouds.

The purpose of the image processing unit 104 is now to analyze the laser interference points 201, as produced by the laser beam source, in the laser interference pattern in the interference image 105. The point structure of laser radiation 101 consists of grid points arranged at virtually equal intervals (a 3×3 grid in FIG. 2). The following information relating to the laser beam source can be detected in the image processing unit 104 by analysis of the position of the laser interference points 201 in the interference image 105:

The grid interval between the laser interference points 201 is a measure of the laser wavelength used in the laser system of the laser beam source.

The position of the laser interference pattern (for example represented by the position of the central laser interference point in the laser interference pattern) provides information about the spatial position of the laser beam source relative to the laser warning system.

The aim of the analysis of the interference image 105 in the image processing unit 104 is, in particular, detection of the grid interval and of the position of the grid structure of the laser interference points 201. One embodiment of the image processing unit 104 and of an image processing method which can be carried out by it will be described in the following text, which allow this analysis to be carried out robustly and quickly.

Such robust and fast analysis can be subdivided into four method steps a)-d). Exemplary embodiments for the steps a)-d) and of devices 302 to 305 for carrying it out are illustrated in schematic form in the form of a block diagram in FIG. 3. At the end of the four method steps a)-d), the grid interval and the position of the grid structure of the laser interference points 201 in an interference image 105 are defined.

Figure 3:
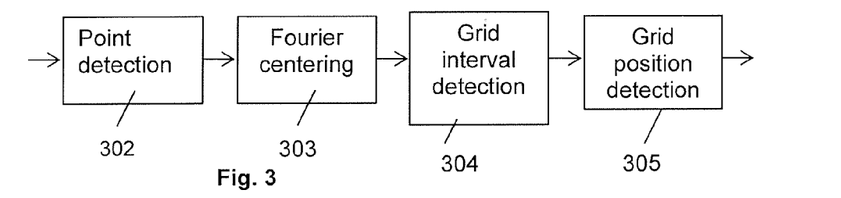
FIG. 3 shows a schematic illustration of an area of an image processing unit of the laser detection apparatus.

FIG. 3 schematically illustrates, in particular, a device for detection of the grid interval and position of the grid structure of the laser interference points 201, as produced by a laser source (for example a laser threat) within an interference image 105. The devices 302 to 305, which are illustrated schematically in FIG. 3, are part of the image processing unit 104 and may, for example, be in the form of software or hardware.

Accordingly, in order to carry out the four method steps a) to d), the image processing unit 104 has a point detection device 302, a transformation device (Fourier centering device) 303, a grid interval detection device 304 and a grid position detection device 305.

The four method steps a) to d) and the devices provided for carrying them out will be described successively in the following text.

Step a): Point Detection

In step a), the interference image 105 is converted to a binary point image f(x,y), which contains the numerical value 1 at image positions (x, y), at which a laser interference point (201) is located. All the other image positions contain the value 0.

Standard image processing methods for point detection can be used to carry out this step (see for example reference [3]). These standard methods include filtering of the interference image using a discrete Laplace operator. If the filter response exceeds a fixed threshold, then a 1 is allocated to the binary point image in the center of the filter mask—otherwise a 0.

Figure 4:
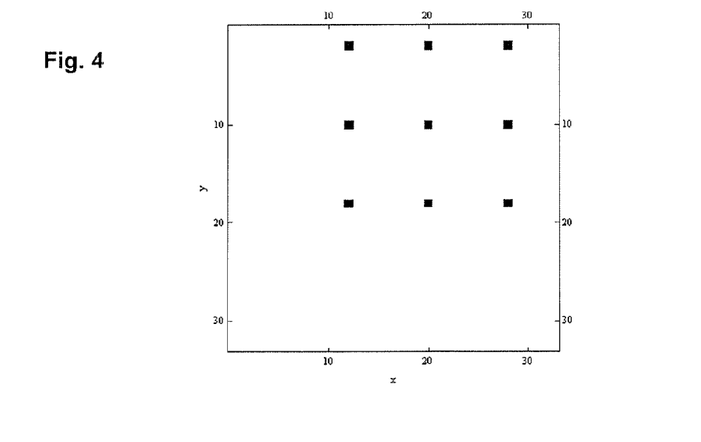
FIG. 4 shows an example of an ideal point image f(x,y) produced by point detection.

FIG. 4 shows an example of an ideal point image f(x,y). FIG. 4 shows an example of an ideal point image f(x,y) produced by point detection a) by means of the point detection device 302. Black areas correspond to the value 1. All the white areas correspond to the value 0. The sought grid interval in this example is 8 pixels for an ideal point image.

A grid interval such as this can still be found relatively easily in the illustrated ideal point image, for example using the method described in more detail below, as will be explained in more detail later.

However, it should not be expected that an ideal (correct) point image will be obtained from the point detection method step. On the one hand, "false negatives" can occur, that is to say laser interference points are incorrectly not identified as such. This is possible, for example, when the laser interference point is covered by the interference pattern of the solar radiation. Furthermore, "false positives" can occur. In this case, points are incorrectly detected which do not correspond to a laser interference point. This is possible, for example, if point-like structures occur in the interference pattern of the solar radiation or in the background (clouds).

Figure 5:
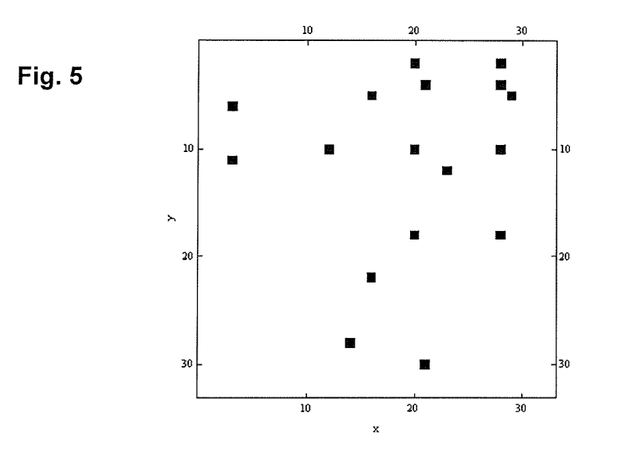
FIG. 5 shows an example of a point image f(x,y) produced by pointed detection, with false-positive and false-negative detections.

FIG. 5 shows a point image produced by false positives and false negatives. To be more precise, FIG. 5 shows an example of a point image f(x,y) produced by point detection according to step a) in the point detection device 302, with false-positive and false-negative detections. In this case as well, the sought grid interval is 8 pixels. As can be seen, this cannot be detected directly here in this way.

The methodology described in the following method steps has the aim, in particular, of allowing the grid interval and the position of the grid structure of the laser interference points to be detected quickly and robustly despite these spurious detections.

Step b): Fourier Centering

In step b), the binary point image f(x,y) produced in step a) is subjected to a trans-formation $f(x,y) \rightarrow F(u,v)$, which is designed such that the grid interval of the point image f(x,y) remains, but the grid in the transformed image F(u,v) has a fixed position, independently of its position in the original image. The image produced by the transformation is referred to in the following text as a centered spectral image F(u,v).

In the next method step, the centered spectral image F(u,v) allows analysis of the grid interval, without having to know the grid position.

Exemplary Embodiment

The centered spectral image F(u,v) is determined in the exemplary embodiment described here from the magnitude of the Fourier back-transformation of the spectral power density (power spectrum) of the Fourier transformation of f(x,y) by means of:

$$F(u,v) = \mathrm{Abs}(\mathrm{Fourier}^{-1}[\mathrm{Abs}(\mathrm{Fourier}[f(x,y)])^2]).$$

In this equation, "Abs" is the magnitude function and "Fourier" is the operator for the discrete two-dimensional Fourier transformation [3]. "Fourier$^{-1}$" is the Fourier back-transformation [3].

This exemplary embodiment will be explained in more detail in the following text. The application of the magnitude function to the Fourier transform of f(x,y) results in loss of the phase information in it. However, the phase information contains the information about the position of the grid within the point image f(x,y). F(u,v) can therefore no longer contain the position information of the grid, and is therefore (as required) independent of its position. However, the power spectrum still contains the information relating to the grid intervals. These information items are mapped back onto the original grid intervals again (as required) by the Fourier back-transformation.

Figure 6:
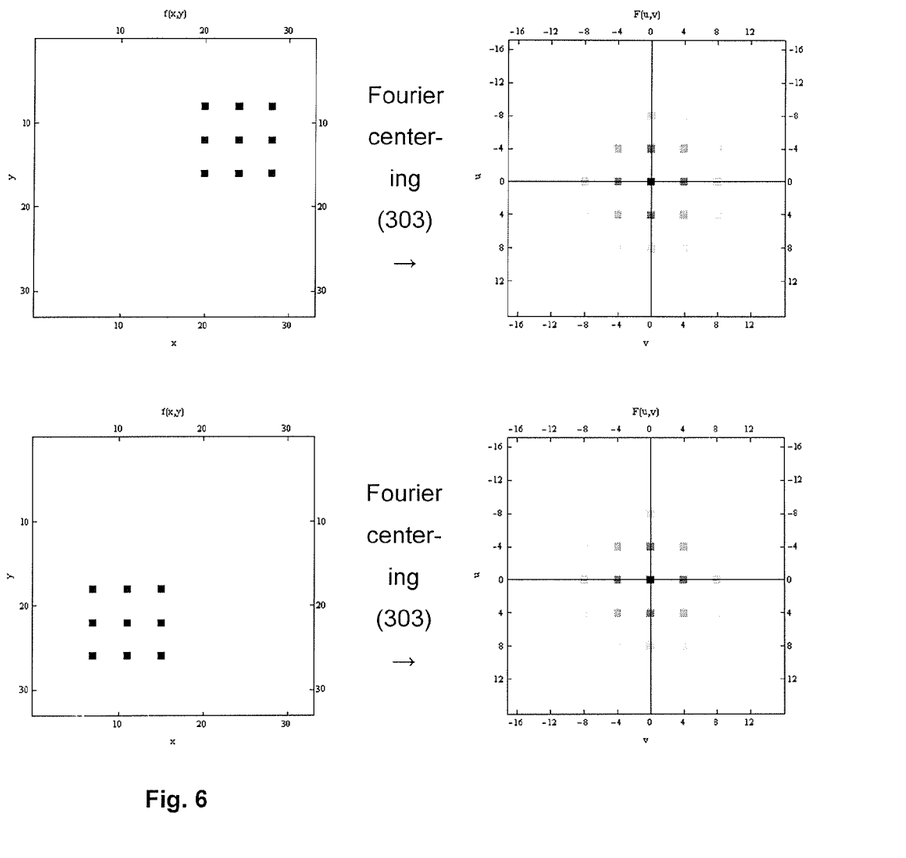
FIG. 6 shows two exemplary illustrations of centered spectral images F(u,v) obtained by Fourier centering from point images f(x,y), with the point image in each case being shown on the left, and the spectral image obtained therefrom on the right, in FIG. 6.

FIG. 6 shows two examples of Fourier centering that is carried out. FIG. 6 in this context shows two exemplary illustrations of the centered spectral image F(u,v) obtained by Fourier centering from the point image f(x,y), as in each case illustrated on the left, in the transformation device 303, which is in the form of a Fourier centering device—in each case illustrated on the right. The (u,v) coordinate system has been chosen for illustrative purposes, as a result of which the direct-current component of the Fourier transformation is located at the center of the image F(u,v). The centered spectral image F(u,v) is independent of the position of the grid structure in f(x,y), but at the same time has the original grid interval.

The major characteristics of Fourier centering include the fact that the centered spectral image produced in this way is independent of the position of the grid structure in the point image. However, at the same time, the Fourier centering includes the grid interval. The centered spectral image is therefore used to allow the dominant grid intervals to be identified.

Figure 7:
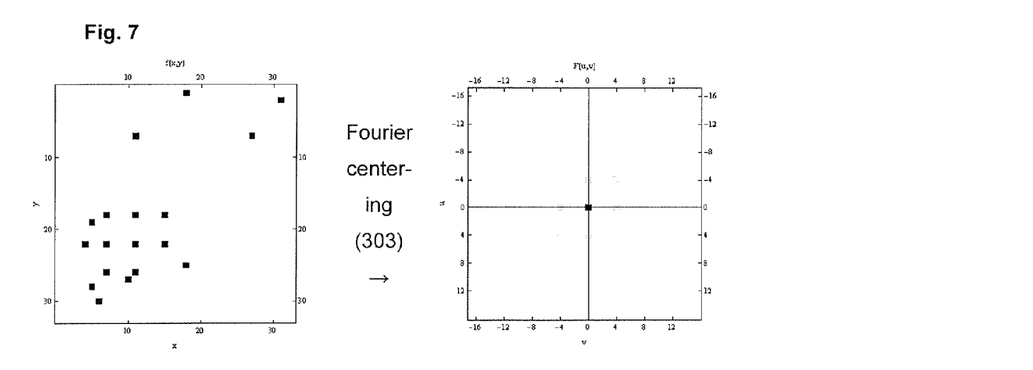
FIG. 7 shows an exemplary illustration of a centered spectral image F(u,v) obtained by Fourier centering from a point image f(x,y), under the influ-ence of false-positive and false-negative detections, once again with the point image being shown on the left and the spectral image obtained therefrom being shown on the right, here.

As can be seen from FIG. 7, the dominant grid interval can also still be seen in the presence of false positives and false negatives. This is made use of in the next method step.

FIG. 7 shows an exemplary illustration of the centered spectral image F(u,v) obtained from the point image f(x,y)

(shown on the left) by Fourier centering by means of the transformation device 303, under the influence of false-positive and false-negative detections. The dominant grid interval can still be seen in the centered spectral image.

Step c): Grid Interval Detection

The aim of method step c) is detection of the grid interval of the laser interference points 201. For this purpose, the centered spectral image F(u,v) obtained in step b) is converted to a spectral vector w={w(1), w(2), w(3), ... }

$$F(u,v) \rightarrow w(k).$$

The image is in this case designed such that w(k) represents a measure of the dominance of the grid interval k.

Exemplary Embodiment

An embodiment of an image such as this can be implemented by adding the intensities that occur for a given grid interval k in the centered spectral image:

$$w(k) = \left(\sum_{u=-2}^{2} \sum_{v=-2}^{2} F(u \cdot k, v \cdot k)\right) - F(0, 0).$$

In this case, the component F(0,0), which is the same for all grid intervals (the direct-current component) need not necessarily also be included in the addition. The summation is shown as an example for the grid intervals k=1 to k=4 in FIG. 8. An example of a spectral vector produced in this way is shown in FIG. 9.

Figure 8:
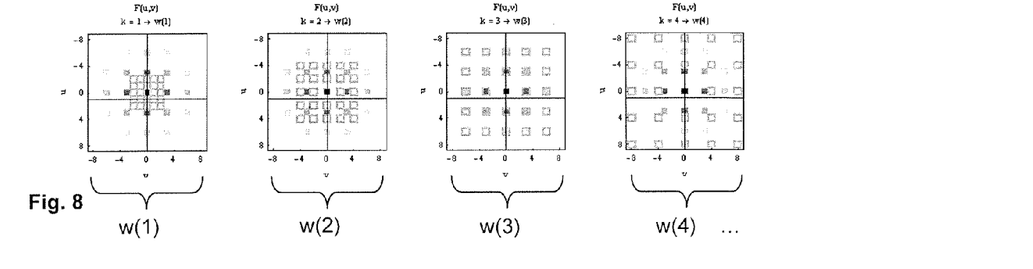
FIG. 8 shows schematic illustrations in order to explain the construction of a spectral vector w by summation of the intensities of a spectral image F(u,v) of the image positions indicated (boldly) for a respectively given grid interval k.

FIG. 8 shows the construction of the spectral vector w by summation of the intensities of the spectral image F(u,v) at the image positions indicated (boldly) for a given grid interval k.

Figure 9:
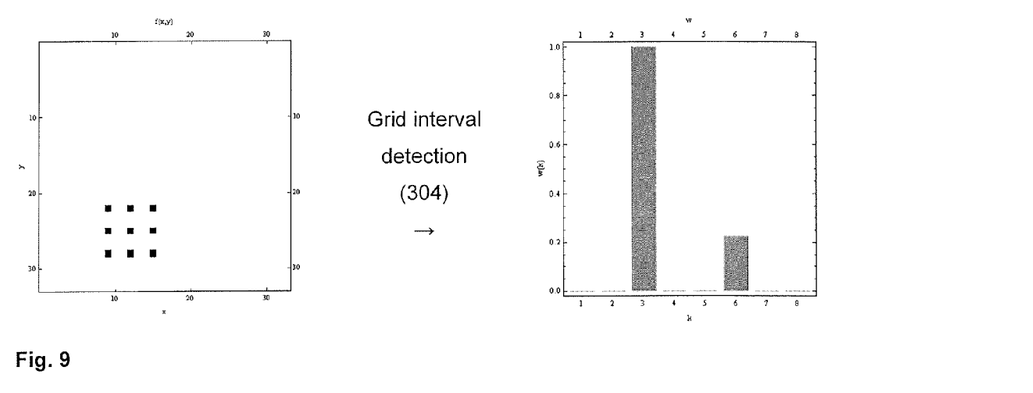
FIG. 9 shows an illustration of a point image f(x,y) and of the corresponding spectral vector w for grid intervals k from 1 to 8.

FIG. 9 illustrates a point image f(x,y) and the corresponding spectral vector w for grid intervals k from 1 to 8. The vector w has been scaled to its maximum value, for illustrative purposes. The dominant grid interval k=3 corresponds to the true grid interval of the point image. The final value for k=6 corresponds to twice the grid interval.

The sought grid interval K is defined by the grid interval k with the maximum w(k):

$$K = \operatorname{argmax} w(k).$$

Figure 10:
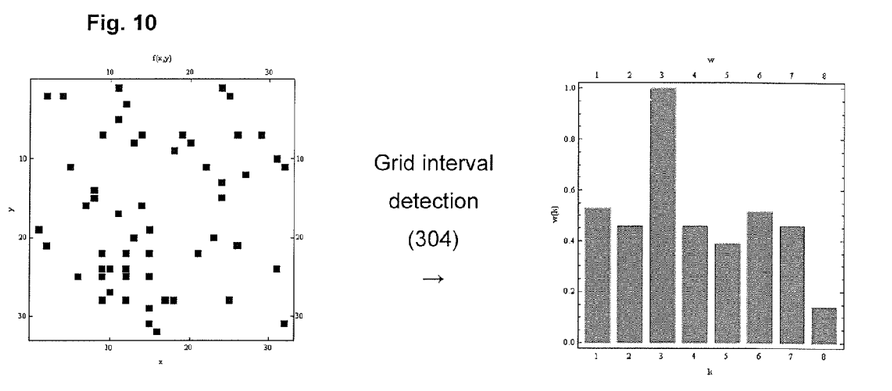
FIG. 10 shows an illustration of a point image f(x,y) and of the corresponding spectral vector w in the presence of false-positive and false-negative spurious detections.

FIG. 10 shows a point image f(x,y) and the corresponding spectral vector w in the presence of false-positive and false-negative spurious detections. The sought grid interval k=3 is dominant in the spectral vector. FIG. 10 shows that it is also possible to detect the grid interval K under the influence of false-positive and false-negative spurious detections, by means of the described embodiment.

Step d): Grid Position Detection

The aim of method step d) is detection of the position of the grid structure of the laser interference points 201 which are present in the interference image 105. The position is in this case considered to have been detected if the point image f(x,y) has been converted to a point image $f_0(x,y)$ which no longer contains any false-positive spurious detections:

$$f(x,y) \rightarrow f_0(x,y).$$

In this case, use is made of the fact that the grid interval K is known from the previous method step c). This allows the point image f(x,y) to be filtered using a bandpass filter fixed to the grid interval.

Exemplary Embodiment

Figure 11:
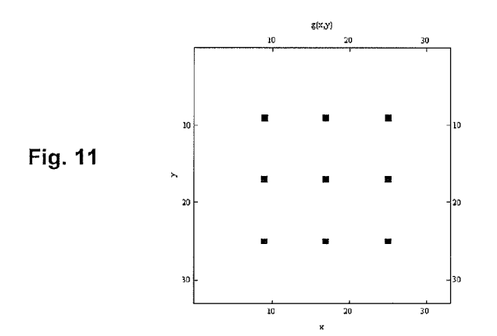
FIG. 11 shows an illustration of an ideal point grid g(x,y) for a given grid interval (in this case using the example k=8)

An ideal point image g(x,y) with the grid interval K is produced in order to carry out the filtering (convolution). FIG. 11 shows one such ideal point image. FIG. 11 shows an ideal point grid g(x,y) for a given grid interval, using the example of K=8.

Using the convolution theorem [3], the filtering can be represented as a product of the Fourier transforms of the point image f(x,y) and of the ideal point image g(x,y), followed by back-transformation:

$$f_0(x,y) = f(x,y) \text{Fourier}^{-1}[\text{Fourier}[f(x,y)] \text{Abs}(\text{Fourier}[g(x,y)])].$$

In this expression, "Abs" is the magnitude function and "Fourier" is the operator for the discrete two-dimensional Fourier transformation, see reference [3] for further details. "Fourier$^{-1}$" is the Fourier back-transformation, see reference [3] for further details.

The element-by-element multiplication by the original (binary) point image f(x,y) additionally ensures that the filtering process does not add any additional points. Therefore, $f_0(x,y)$ contains exclusively points which were already present in f(x,y). Points which do not correspond to the correct grid interval K have their intensity suppressed by the filtering process, however. Numerical values in $f_0(x,y)$ which are below a defined threshold are set to the value 0. All numerical values above the threshold are set to 1. The binary image f(x,y) is therefore converted to the binary image $f_0(x,y)$, and now contains only points which correspond to the grid interval K. The position of the grid structure of the laser interference points (201) in the interference image is thus detected.

Figure 12:
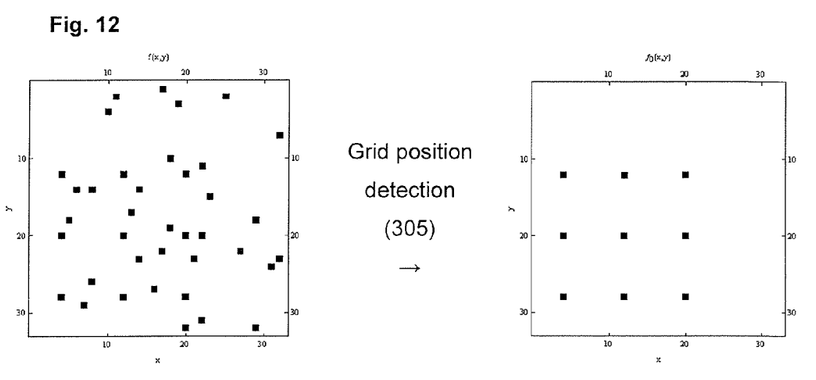
FIG. 12 shows an illustration of the detection of the grid position in the presence of false-positive and false-negative spurious detections.

FIG. 12 shows one example of the application of grid position detection to a point image in the presence of false-positive and false-negative spurious detections.

Advantages

The image processing method described above and the laser detection method using it have, in particular, the following advantages:

- The method is based primarily on Fourier transformations which can be carried out very efficiently on different hardware platforms, for example as Fast-Fourier transformations.
- In particular, implementation is thus (with appropriately adapted optics) feasible on mobile, miniaturized terminals (PDA's, Smartphones, mobile telephones, digital cameras, ... ). By way of example, this allows low-cost implementation of "sniper detection".
- The method is robust against spurious detections of interference points. The complexity of the method does not increase with the number of spurious detections.
- The method does not require a search for "specific" grid intervals (which correspond to the wavelengths of specific laser sources). The complexity of the method for a search such as this would increase linearly with the number of laser sources to be searched for. In contrast, in the case of the method described here, all the dominantly occurring grid intervals in the spectral vector w(k) can be read at the same time from step c).

Possible Alternative Embodiments

One particularly preferred embodiment of an image processing method according to the invention and of a laser identification method which uses this has been described above. On the basis of this description, embodiments for laser detection apparatuses which are suitable for carrying out such methods will also easily be evident to a person skilled in the art. In particular, apparatuses such as these use software or hardware in which appropriate commands are implemented for carrying out the image processing.

However, the invention is in no way restricted to the described exemplary embodiments. Various alternative procedures are feasible for the various steps. Some of these will be explained briefly in the following text.

Figure 13:
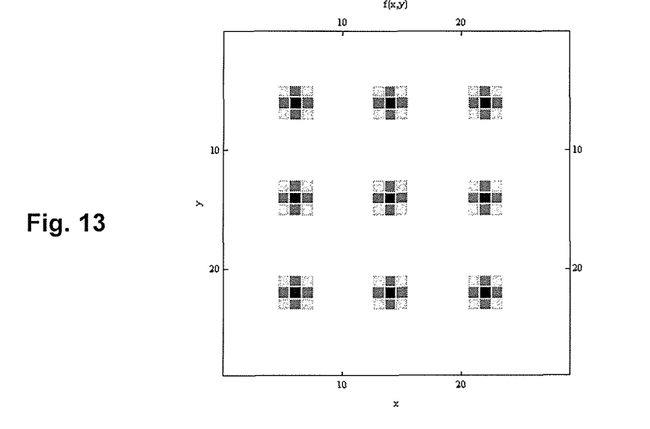
FIG. 13 shows an example of the alternative use of area point structures in the point image f(x,y), instead of a binary image.

In a further exemplary embodiment, the binary point image f(x,y) produced in step a) can alternatively be replaced by an intensity image with area point structures. By way of example, a point structure such as this can be produced by two-dimensional Gaussian distributions with a maximum at the positions of the laser interference points, see FIG. 13 by way of example. This makes it possible to handle grid structures which are not ideally equidistant, or position inaccuracies in the point detection.

According to yet another exemplary embodiment, a plurality of laser sources which occur at the same time and are at a different wavelength can be identified in step c) by the detection of possible further grid intervals which are dominant in w(k). It is accordingly possible to detect not only one laser source but also a plurality of laser sources at different wavelengths. For this purpose, a group of dominant wavelengths, for example those two, three or four wavelengths which produce the two, three or four highest intensity values, are detected in step c).

According to further exemplary embodiments, a different mathematical model can also be used in step c) to convert $F(u,v)$ to $w(k)$, as an alternative to the summation over $F(u,v)$, as has been described above, providing the condition is satisfied that $w(k)$ represents a measure for the dominance of the grid interval k.

According to further exemplary embodiments, additional prior knowledge of grid intervals which are possible in principle (corresponding to the wavelengths of laser sources under consideration) can alternatively be used in step c) for faster and more robust identification of dominant grid intervals in the spectral vector $w(k)$. By way of example, this makes it possible to restrict the search for extreme values in $w(k)$ to the area of interest.

In further exemplary embodiments, the evidence of the identification of dominant grid intervals in the spectral vector $w(k)$ is increased in step c) by simultaneous consideration of previous spectral vectors in time (from previous interference images in time), for example by averaging over time.

In yet another exemplary embodiment, the filtering of the point image onto the dominant grid interval before multiplication by the original point image is alternatively repeated a number of times recursively in step d). This results in greater suppression of spurious detections.

The methodology described here can be generalized to the situation in which the grid intervals differ in the x and y directions.

The described methodology can also be generalized to the situation in which the individual grid points in the grid structure consist of interference double-point patterns or (in general) multi-point patterns.

The described methodology can be generalized to the situation in which a different number of diffraction orders of the laser interference points are produced in the interference image. By way of example, a 5×5 grid structure can be used instead of the previously considered 3×3 grid structure. The generalization also includes a one-dimensional point structure (for example 3×1 laser interference points).

What is claimed is:

1. A laser beam detection apparatus comprising:
    an interference image production apparatus configured to produce an interference image from detected light radiation;
    an image recording device configured to record the interference image; and
    an image processing unit configured to process the interference image recorded by the image recording device to detect laser beams in the light radiation, the image processing unit including:
        a point detection component configured to detect a spatially defined point distribution from the interference image;
        a transformation component configured to transform the point distribution such that a grid interval remains between a point grid in the point distribution, and a fixed position, which is independent of a position of the point grid in the interference image, is associated with the point grid;
        a grid interval detection component configured to detect a grid interval in the point grid transformed by the transformation device; and
        a grid position detection component configured to detect the position of the point grid from the point distribution by filtering in consideration of the grid interval detected by the grid interval detection component.

2. The laser beam detection apparatus as claimed in claim 1, wherein
    the point detection component is further configured to perform at least one of the following operations:
        convert the interference image to a binary point image f(x,y) by allocating a first binary value to those image positions x, y at which an interference point is located, and by allocating a second binary value to the remaining image positions; and
        convert the interference image to an intensity image with area point structures which have an intensity distribution distributed over an area.

3. The laser beam detection apparatus as claimed in claim 2, wherein
    the point detection component includes a filter that is configured to filter the interference image with a discrete Laplace operator, and a comparator that is configured to compare a filter result with a threshold, in order to in each case assign the first binary value or the second binary value to the image positions to produce the binary point image f(x,y).

4. The laser beam detection apparatus as claimed in claim 1, wherein
    the transformation component is configured to produce a centered spectral image F(u,v) in which a point grid which is contained in the point image is centered independently of the position of the point grid in the interference image.

5. The laser beam detection apparatus as claimed in claim 1, wherein
    the transformation component is configured to perform a Fourier transformation to transform the point distribution.

6. The laser beam detection apparatus as claimed in claim 1, wherein
    the transformation component is configured to produce spectral image data F(u,v) by formation of a magnitude of a Fourier back-transformation of a spectral power density of the Fourier transformation of the point distribution f(x,y), using the following formula:

$$F(u,v) = \mathrm{Abs}(\mathrm{Fourier}^{-1}[\mathrm{Abs}(\mathrm{Fourier}[f(x,y)])^2])$$

where
F(u,v) is the spectral image value at the position (u,v),
Abs is the magnitude function,
Fourier is the operator of a discrete two-dimensional Fourier transformation,
f(x,y) is the point image value of the point distribution at the position (x,y) and
Fourier$^{-1}$ is the operator of the Fourier back-transformation.

7. The laser beam detection apparatus as claimed in claim 1, wherein
the grid interval detection component is configured to determine the grid interval or those grid intervals for which, or aligned with a respective position of which, highest intensities can be detected in the point distribution transformed by the transformation component.

8. The laser beam detection apparatus as claimed in claim 1, wherein
the grid interval detection component includes a spectral vector production component configured to produce a data record $w=\{w(k_1), w(k_2), \ldots w(k_n)\}$ which associates a plurality of different grid intervals $k_1, k_2, \ldots, k_n$ with the sum of an intensity detected at a plurality of points on a point grid with the respective grid interval $k_1, k_2, \ldots, k_n$ in the transformed point distribution associated with a specific position.

9. The laser beam detection apparatus as claimed in claim 8, wherein
the grid interval detection component further includes a comparison component configured to perform at least one of the following operations:
compare values of the data record produced by the spectral vector production device with one another, in order to determine a grid interval $K \in \{k_1, k_2, \ldots, k_n\}$ with a maximum value w(K) and to output this grid interval as the detected grid interval; and
determine a group k with highest values w(k) and output this group k as the detected grid interval.

10. A laser beam detection method comprising
producing an interference image from detected light radiation; and
processing the interference image to detect laser radiation, wherein the processing includes:
detecting a spatially defined point distribution from the interference image;
transforming the point distribution such that a grid interval remains between a point grid in the point distribution, and a fixed position, which is independent of a position of the point grid in the interference image, is associated with the point grid;
detecting a grid interval in the point grid transformed according to the transforming; and
detecting the position of the point grid from the point distribution by filtering in consideration of the grid interval detected.

11. The laser beam detection method as claimed in claim 10, wherein
the detecting of a spatially defined point distribution includes at least one of the following operations:
converting the interference image to a binary point image f(x,y), with a first binary value being allocated to those image positions (x,y) at which an interference point is located, and with a second binary value being allocated to the remaining image positions; and
converting the interference image to an intensity image with area point structures which have an intensity distribution which is distributed over an area.

12. The laser beam detection method as claimed in claim 11, wherein
the converting of the interference image to a binary point image f(x,y) includes filtering the interference image with a discrete Laplace operator and comparing a filter result with a predefined threshold, with the first binary value f(x,y)=1 being allocated to each corresponding pixel (x,y) if the filter result is at least equal to the threshold and the second binary value f(x,y)=0 being allocated to each corresponding pixel (x,y) if the filter result is less than the threshold.

13. The laser beam detection method as claimed in claim 10, wherein
the transforming includes producing a centered spectral image F(u,v) in which a point grid which is contained in the point image is centered independently of the position of the point grid in the interference image.

14. The laser beam detection method as claimed in claim 10, wherein
the transforming includes performing a Fourier transformation of the point distribution.

15. The laser beam detection method as claimed in claim 10, wherein
the transforming includes producing a spectral image data F(u,v) by formation of a magnitude of a Fourier back-transformation of a spectral power density of the Fourier transformation of the point distribution f(x,y) using the following formula:

$$F(u,v) = \mathrm{Abs}(\mathrm{Fourier}^{-1}[\mathrm{Abs}(\mathrm{Fourier}[f(x,y)])^2])$$

where
F(u,v) is the spectral image value at the position (u,v),
Abs is the magnitude function,
Fourier is the operator of a discrete two-dimensional Fourier transformation,
f(x,y) is the point image value of the point distribution at the position (x,y) and
Fourier$^{-1}$ is the operator of the Fourier back-transformation.

16. A laser beam detection method as claimed in claim 10, wherein
the detecting of a grid interval includes detecting that grid interval or those grid intervals for which, or aligned with a respective position of which, highest intensities can be found in the point distribution transformed by the transforming.

17. The laser beam detection method as claimed in claim 10, wherein
the detecting of a grid interval includes
detecting a total intensity at a plurality of points (u,v), which are arranged with a specific grid interval k in a point grid, of the point image F(u,v) transformed by the transforming, for each of a plurality of different grid intervals;
determining a maximum of the total intensity detected or a highest of the total intensities detected; and
selecting the grid interval or intervals for which the highest total intensity or intensities was or were determined as the detected grid interval K.

18. The laser beam detection method as claimed in claim 10, wherein
   detecting of the position of the point grid includes filtering a point image f(x,y) detected in the detecting of the position of the point grid with a band filter, which is fixed to the grid interval detected.

19. The laser beam detection method as claimed in claim 10, wherein
   the detecting of the position of the point grid includes:
      forming an ideal point image g(x,y) with the grid interval K detected;
      forming a filtered point image $f_0(x,y)$ using the formula:

$$f_0(x,y)=f(x,y)\text{Fourier}^{-1}[\text{Fourier}[f(x,y)]\text{Abs}(\text{Fourier}[g(x,y)])],$$

where
      f(x,y) is the point image detected,
      Fourier is the operator of a Fourier transformation,
      Abs is the operator of the magnitude function, and
      Fourier is the operator of a Fourier back-transformation; and
   determining the position of a grid in the filtered point image.

\* \* \* \* \*